United States Patent
Rotenstein et al.

(10) Patent No.: US 11,113,823 B2
(45) Date of Patent: Sep. 7, 2021

(54) THREE-DIMENSIONAL DETECTION AND TRACKING PIPLINE RECOMMENDATION USING PERFORMANCE PREDICTION

(71) Applicant: SEIKO EPSON CORPORATION, Tokyo (JP)

(72) Inventors: Andrei Mark Rotenstein, Vaughan (CA); Asheer Kasar Bachoo, Newmarket (CA); Christina Melissa Sutanto, Whitby (CA); Jennifer Jianing Sun, Pasadena, CA (US); Ariel Shlomo Kelman, Toronto (CA)

(73) Assignee: SEIKO EPSON CORPORATION, Tokyo (JP)

( * ) Notice: Subject to any disclaimer, the term of this patent is extended or adjusted under 35 U.S.C. 154(b) by 187 days.

(21) Appl. No.: 16/148,615

(22) Filed: Oct. 1, 2018

(65) Prior Publication Data
US 2020/0105001 A1    Apr. 2, 2020

(51) Int. Cl.
*G06F 1/16* (2006.01)
*G06F 8/34* (2018.01)
(Continued)

(52) U.S. Cl.
CPC .............. *G06T 7/246* (2017.01); *G06F 8/34* (2013.01); *G06K 9/6257* (2013.01);
(Continued)

(58) Field of Classification Search
None
See application file for complete search history.

(56) References Cited

U.S. PATENT DOCUMENTS

2014/0241617 A1* 8/2014 Shotton ............... G06K 9/66
382/159
2016/0174902 A1* 6/2016 Georgescu ........... G06T 7/0012
600/408
(Continued)

OTHER PUBLICATIONS

Boshra et al; "Predicting Object Recognition Performance Under Data Uncertainty, Occlusion and Clutter;" Center for Research in Intelligent Systems, University of California; 1998; pp. 556-560.
(Continued)

*Primary Examiner* — Soo Shin
(74) *Attorney, Agent, or Firm* — Oliff PLC

(57) ABSTRACT

Systems and method for predicting performance of pipelines for object detection, pose estimation, and object tracking are provided. In one embodiment, a plurality of regressors are stored where each regressor may be trained for a specific object detection (OD), pose estimation (PE), and/or tracking pipeline, so that each regressor outputs a score equal to or greater than that of another regressor in response to a first feature vector as input, the first feature vector corresponding to a first object that is more suitable for the specific pipeline than other pipelines. A second feature vector is stored corresponding to a second object. The regressors are run with the second feature vector as input to derive respective scores, and a recommendation of at least one pipeline is indicated based on the derived scores with respect to the second object. OD/PE/tracking may then be performed using the at least one indicated pipeline.

15 Claims, 8 Drawing Sheets

(51) Int. Cl.
*G06K 9/46* (2006.01)
*G06K 9/62* (2006.01)
*G06K 9/32* (2006.01)
*G06T 7/20* (2017.01)
*G06T 7/246* (2017.01)
*G06T 7/70* (2017.01)
*G06T 7/73* (2017.01)
*G06T 7/80* (2017.01)
*G06T 19/00* (2011.01)

(52) U.S. Cl.
CPC .............. *G06K 9/6262* (2013.01); *G06T 7/73* (2017.01); *G06T 19/006* (2013.01); *G06T 2207/20081* (2013.01); *G06T 2207/20084* (2013.01)

(56) References Cited

U.S. PATENT DOCUMENTS

2016/0196480 A1* 7/2016 Heifets .................. G06N 3/088 382/158
2019/0147220 A1* 5/2019 Mccormac ........... G06K 9/6257 382/103
2019/0164021 A1* 5/2019 Heifets ................. G16B 20/00
2019/0179509 A1* 6/2019 Daie ..................... G06F 3/0485

OTHER PUBLICATIONS

Zhang et al; "Preditcting Failures of Vision Systems;" IEEE Conference on Computer Vision and Pattern Recognition; 2014; pp. 3566-3573.

Rublee et al; "Orb: An Efficient Alternative to SIFT or SURF;" IEEE International Conference on Computer Vision; 2011; pp. 2564-2571.

Ojala et al; "Performance Evaluation of Texture Measures with Classification Based on Kullback Discrimination of Distributions;" Department of Electrical Engineering, University of Oulu; Center of Automation Research, University of Maryland; 1994; pp. 582-585.

* cited by examiner

THREE-DIMENSIONAL DETECTION AND TRACKING PIPLINE RECOMMENDATION USING PERFORMANCE PREDICTION

BACKGROUND

1. Technical Field

The disclosure relates generally to the field of object detection and pose estimation in image data streams, and more specifically to augmented reality systems including low feature object detection and pose estimation in image data streams.

2. Related Art

Augmented Reality (AR) has become increasingly common with the advancement of computer technology. A general definition of AR is capturing a real-world scene and adding artificial (virtual) elements using software. This can enhance a user's perception of the real world or provide entertainment to the user.

Object tracking is important in many AR implementations. This means that a real-world object is "followed" by an artificial object, such as computer-graphics enhancements or an information bubble (as perceived by the user). In other words, if the real-world object moves or the user's view moves relative to the real-world object, the artificial object will remain in the same location relative to the real-world object and/or the content of the artificial object will be determined based on the movement and/or new location of the real-world object. Location tracking is also important in many AR implementations. This means that a virtual object will stay in one location in the scene, regardless of the movement of the user.

One platform for implementing AR is the smartphone. The presence of a camera, display device, and processor on the same device allows for software to easily add artificial elements to a live scene captured by the camera. Moreover, the presence of motion sensors and locators (e.g. accelerometers and GPS) on these devices is exploited by the software to better implement AR.

To improve on the AR experience, the transparent head-mounted display (HMD) can implement AR. These systems are usually glasses with prisms placed in front of the eyes. The user views the scene directly through the glasses. The prisms allow for artificial images to be overlaid on the scene as perceived by the user. Meanwhile, the HMD collects data from the scene using a camera.

To create an AR environment, an AR software developer may train the processor using sample image data of various objects. Given the proper tools to create an AR environment, the AR software developer can develop graphics that can be augmented with a real-world scene. To develop the graphics, a software developer may collect training data while performing pose estimation. Also, the software developer may be required to choose an algorithm or configuration that dictates how the sample image data is processed within a processing pipeline of a training computer. However, numerous algorithms may be available and the AR software developer normally would not know what algorithm would be best for the particular software application.

An Augmented Reality software development kit (AR SDK) may include a system for 3D Object Detection and Tracking (OD/PE/Tracking) for use in AR application software by the AR software developers.

SUMMARY

The system can be configured in more than one way, and the most appropriate configuration depends upon physical aspects of the application domain, such as what type of object is to be tracked. Developers who wish to use the SDK to develop AR application software must select the system algorithms or configurations that are appropriate to the application domain.

A problem is that developers cannot be expected to have expert knowledge in the art of 3D Object Detection and Tracking (OD/PE/Tracking) in order to be able to understand how to choose the configuration that is most appropriate to their application domain. It may be preferred to provide software developers with a recommendation system that is able to recommend or choose configurations for them automatically, based on data they provide about their application domain.

An advantage of some aspects of the disclosure is to solve at least a part of the problems described above, and aspects of the disclosure can be implemented as the following aspects.

One of the purposes of the present disclosure is to provide an AR software developer with a recommendation system that can give them a recommendation about which pipeline to use for their application when OD/PE/Tracking algorithm training data is provided. The recommendation system may be constructed using prior experience about performance obtained in a laboratory setting (when a training tool is developed before use by an AR software developer).

One aspect of the disclosure is a non-transitory computer readable medium for storing instructions that enable one or more processors to train a first regressor on the basis of (i) training input data sets of test objects and (ii) first performance data sets, so that the first regressor outputs data that approximates to the first performance data sets when the training input data sets are input thereto. The first performance data sets may be based on a first pose and a reference pose of each test object. The first pose of each test object may be obtained from a pose derivation device running a first pipeline to derive the first pose based on the corresponding training input data set and an image of each test object captured by a camera. The one or more processors may also train a second regressor on the basis of (iii) the training input data sets of the test objects and (iv) second performance data sets, so that the second regressor outputs data that approximates to the second performance data sets when the training input data sets are input thereto. The second performance data sets may be based on a second pose and the reference pose of each test object. The second pose of each test object may be obtained from the pose derivation device running a second pipeline to derive the second pose based on the corresponding training input data set and the image of each test object captured by the camera.

The present disclosure further includes an embodiment of a method that includes storing, in a first memory area, at least two regressors. Each regressor is trained for a corresponding specific object detection (OD), pose estimation (PE), and/or tracking pipeline, so that each regressor outputs a score equal to or greater than that of the other regressor in response to a first feature vector as input. The first feature vector corresponds to a first object that is more suitable for the corresponding pipeline than the other pipeline. The method further includes storing, in a second memory, a second feature vector corresponding to a second object and running the regressors with the second feature vector as input to derive respective scores. Also, the method includes indicating, on a display, a recommendation of at least one pipeline based on the derived scores with respect to the second object. The method also includes performing OD/PE/tracking using the at least one indicated pipeline.

According to yet another embodiment, a non-transitory computer readable medium is provided, which stores instructions, which, when executed by one or more processors, perform a method comprising storing, in a first memory area, training data corresponding to an object, where the training data includes flag data. The method also includes receiving image frames including the object in a real scene, and selecting one of object detection (OD), pose estimation (PE), and/or tracking algorithm from among a plurality of OD/PE/tracking algorithms stored in a second memory area based on the flag data. In addition, the method includes deriving a pose of the object with respect to a camera that captures the image frames, using one of the image frames and the selected OD/PE/tracking algorithm.

According to some aspects of this disclosure, a head-mounted display device includes a camera, one or more memories, a display device, and a processor configured by instructions stored in the one or more memories to perform a method. The method may include one or more of the methods described above.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Figure 1:
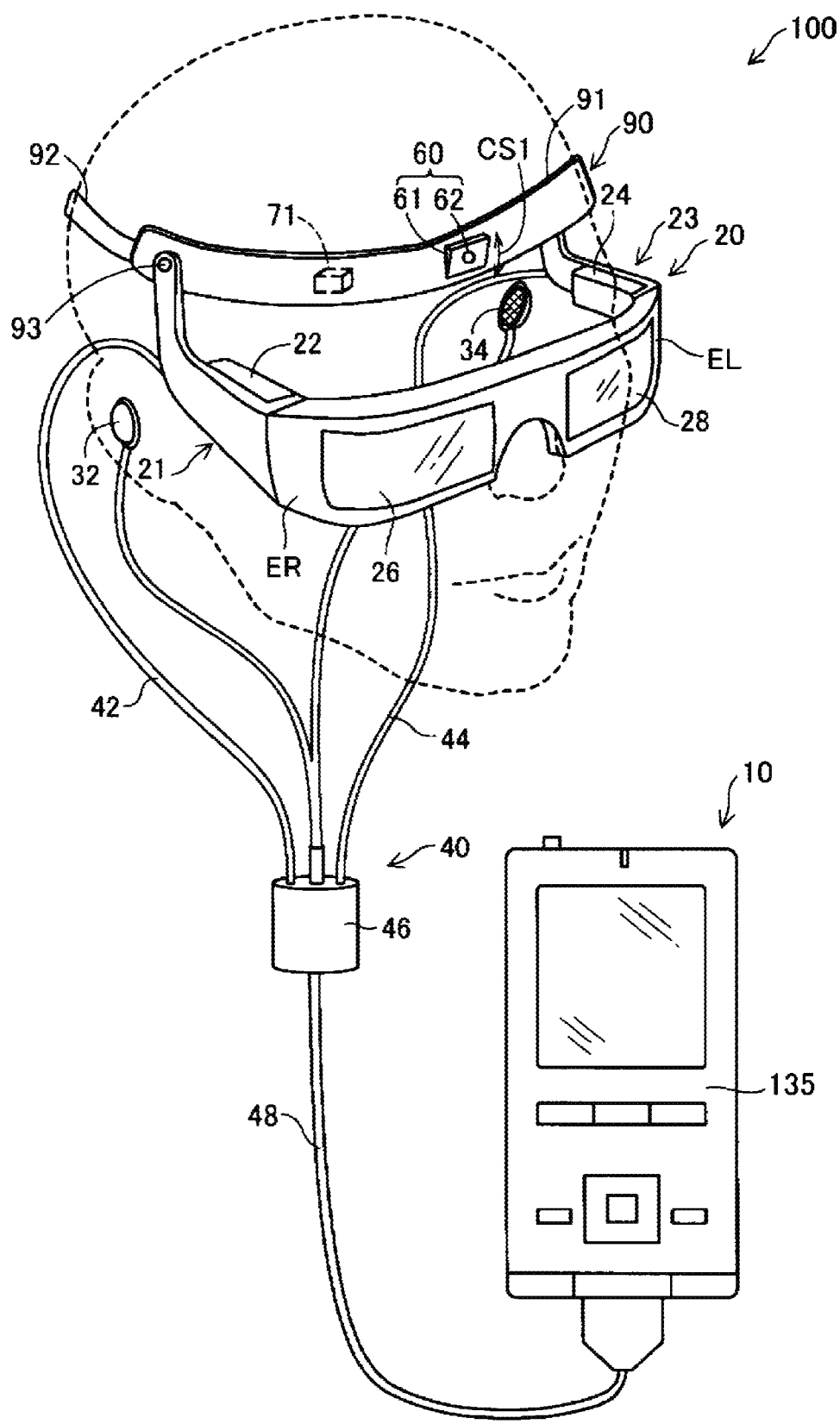
FIG. 1 is a diagram illustrating a schematic configuration of an example HMD.

FIG. 1 shows a schematic configuration of an HMD 100. The HMD 100 is a head-mounted display device (a head mounted display). The HMD 100 is an optical transmission type. That is, the HMD 100 can cause a user to sense a virtual image and, at the same time, cause the user to directly visually recognize an outside scene.

The HMD 100 includes a wearing belt 90 wearable on the head of the user, a display section 20 that displays an image, and a control section 10 that controls the display section 20. The display section 20 causes the user to sense a virtual image in a state in which the display section 20 is worn on the head of the user. The display section 20 causing the user to sense the virtual image is referred to as "display AR" as well. The virtual image sensed by the user is referred to as AR image as well.

The wearing belt 90 includes a wearing base section 91 made of resin, a belt 92 made of cloth coupled to the wearing base section 91, a camera 60, and an IMU (Inertial Measurement Unit) 71. The wearing base section 91 has a shape curved along the form of the frontal region of a person. The belt 92 is worn around the head of the user.

The camera 60 functions as an imager. The camera 60 is capable of imaging an outside scene and disposed in a center portion of the wearing base section 91. In other words, the camera 60 is disposed in a position corresponding to the center of the forehead of the user in a state in which the wearing belt 90 is worn on the head of the user. Therefore, the camera 60 images an outside scene, which is a real scene on the outside in a line of sight direction of the user, and acquires a captured image, which is an image captured by the camera 60, in the state in which the user wears the wearing belt 90 on the head.

The camera 60 includes a camera base 61 that rotates with respect to the wearing base section 91 and a lens 62, a relative position of which is fixed with respect to the camera base 61. The camera base 61 is disposed to be capable of rotating along an arrow CS1, which indicates a predetermined range of an axis included in a plane including the center axis of the user, when the wearing belt 90 is worn on the head of the user. Therefore, the direction of the optical axis of the lens 62, which is the optical axis of the camera 60, can be changed in the range of the arrow CS1. The lens 62 images a range that changes according to zooming centering on the optical axis.

The IMU 71 is an inertial sensor that detects acceleration. The IMU 71 can detect angular velocity and terrestrial magnetism in addition to the acceleration. The IMU 71 is incorporated in the wearing base section 91. Therefore, the IMU 71 detects acceleration, angular velocity, and terrestrial magnetism of the wearing belt 90 and the camera base section 61.

A relative position of the IMU 71 to the wearing base section 91 is fixed. Therefore, the camera 60 is movable with respect to the IMU 71. Further, a relative position of the display section 20 to the wearing base section 91 is fixed. Therefore, a relative position of the camera 60 to the display section 20 is movable. In some other embodiments, the camera 60 and IMU 71 may be provided in the display section 20, so that they are fixed with respect to the display section 20. The spatial relationships represented by the rotation and translation matrices among the camera 60, IMU 70 and display section 20, which have been obtained by calibration, are stored in a memory area or device in the control section 10.

The display section 20 is coupled to the wearing base section 91 of the wearing belt 90. The display section 20 is an eyeglass type. The display section 20 includes a right holder 21, a right display driver 22, a left holder 23, a left display driver 24, a right optical-image display 26, and a left optical-image display 28.

The right optical-image display 26 and the left optical-image display 28 are located in front of the right eye and the left eye of the user when the user wears the display section 20. One end of the right optical-image display 26 and one end of the left optical-image display 28 are connected to each other in a position corresponding to the middle of the forehead of the user when the user wears the display section 20.

The right holder 21 has a shape extending in a substantial horizontal direction from an end portion ER, which is the other end of the right optical-image display 26, and inclining obliquely upward halfway. The right holder 21 connects the end portion ER and a coupling section 93 on the right side of the wearing base section 91.

Similarly, the left holder 23 has a shape extending in a substantial horizontal direction from an end portion EL, which is the other end of the left optical-image display 28 and inclining obliquely upward halfway. The left holder 23 connects the end portion EL and a coupling section (not shown in the figure) on the left side of the wearing base section 91.

The right holder 21 and the left holder 23 are coupled to the wearing base section 91 by left and right coupling sections 93 to locate the right optical-image display 26 and the left optical-image display 28 in front of the eyes of the user. Note that the coupling sections 93 couple the right holder 21 and the left holder 23 to be capable of rotating and capable of being fixed in any rotating positions. As a result, the display section 20 is provided to be capable of rotating with respect to the wearing base section 91.

The right holder 21 is a member provided to extend from the end portion ER, which is the other end of the right optical-image display 26, to a position corresponding to the temporal region of the user when the user wears the display section 20.

Similarly, the left holder 23 is a member provided to extend from the end portion EL, which is the other end of the left optical-image display 28 to a position corresponding to the temporal region of the user when the user wears the display section 20. The right display driver 22 and the left display driver 24 are disposed on a side opposed to the head of the user when the user wears the display section 20.

The display drivers 22 and 24 include liquid crystal displays 241 and 242 (hereinafter referred to as "LCDs 241 and 242" as well) and projection optical systems 251 and 252 explained below. The configuration of the display drivers 22 and 24 is explained in detail below.

The optical-image displays 26 and 28 include light guide plates 261 and 262 and dimming plates explained below. The light guide plates 261 and 262 are formed of a light transmissive resin material or the like and guide image lights output from the display drivers 22 and 24 to the eyes of the user.

The dimming plates are thin plate-like optical elements and are disposed to cover the front side of the display section 20 on the opposite side of the side of the eyes of the user. By adjusting the light transmittance of the dimming plates, it is possible to adjust an external light amount entering the eyes of the user and adjust visibility of a virtual image.

The display section 20 further includes a connecting section 40 for connecting the display section 20 to the control section 10. The connecting section 40 includes a main body cord 48 connected to the control section 10, a right cord 42, a left cord 44, and a coupling member 46.

The right cord 42 and the left cord 44 are two cords branching from the main body cord 48. The display section 20 and the control section 10 execute transmission of various signals via the connecting section 40. As the right cord 42, the left cord 44, and the main body cord 48, for example, a metal cable or an optical fiber can be adopted.

The control section 10 is a device for controlling the HMD 100. The control section 10 includes an operation section 135 including an electrostatic track pad and a plurality of buttons that can be pressed. The operation section 135 is disposed on the surface of the control section 10.

Figure 2:
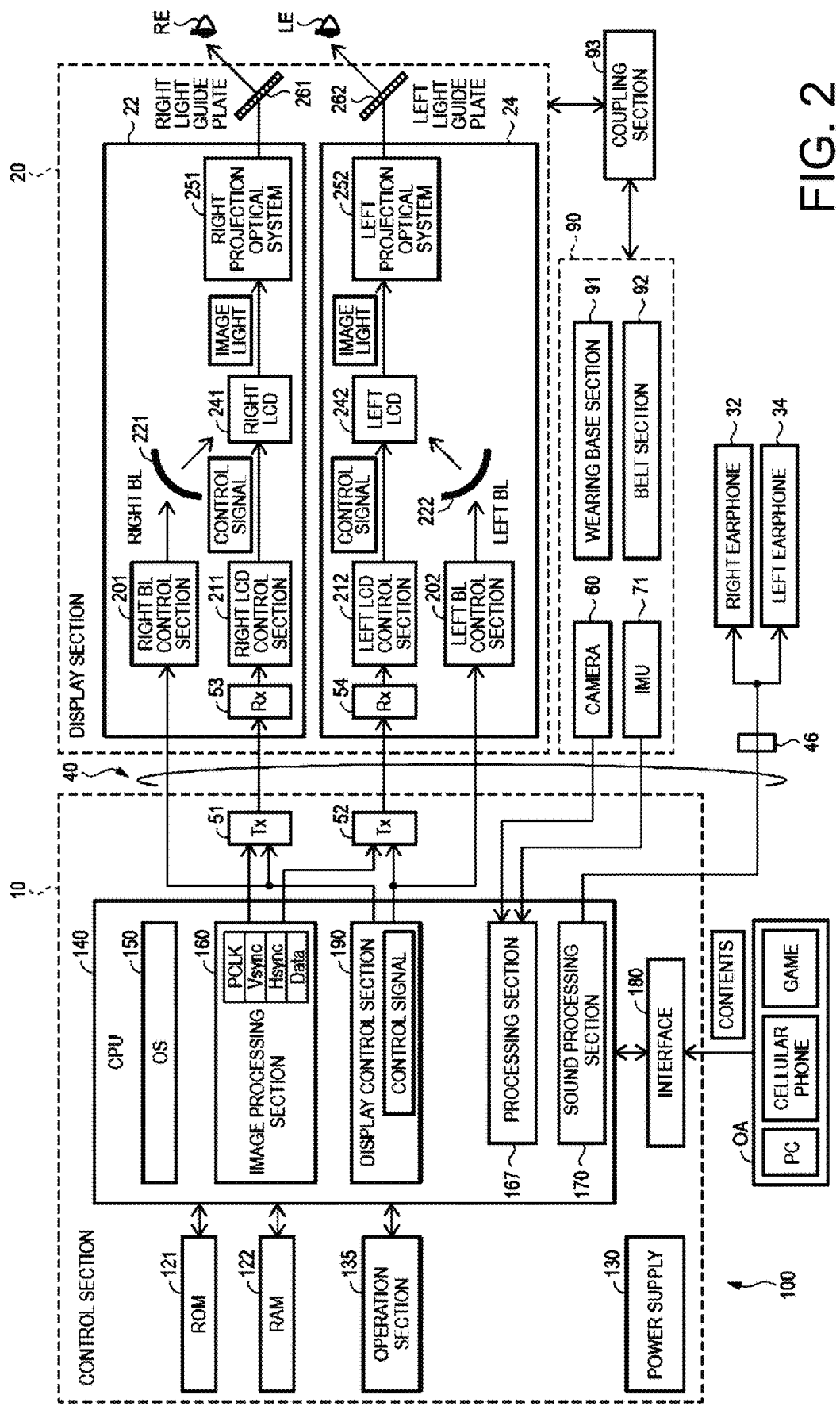
FIG. 2 is a block diagram illustrating a functional configuration of the HMD shown in FIG. 1.

FIG. 2 is a block diagram functionally showing the configuration of the HMD 100. As shown in FIG. 2, the control section 10 includes a ROM 121, a RAM 122, a power supply 130, the operation section 135, a CPU 140 (sometimes also referred to herein as processor 140), an interface 180, and a transmitter (Tx 51) and a transmitter 52 (Tx 52).

The power supply 130 supplies electric power to the sections of the HMD 100. Various computer programs are stored in the ROM 121. The CPU 140 develops, in the RAM 122, the computer programs stored in the ROM 121 to execute the computer programs. The computer programs include computer programs for realizing tracking processing and AR display processing explained below.

The CPU 140 develops or loads, in the RAM 122, the computer programs stored in the ROM 121 to function as an operating system 150 (OS 150), a display control section 190, a sound processing section 170, an image processing section 160, and a processing section 167.

The display control section 190 generates control signals for controlling the right display driver 22 and the left display driver 24. The display control section 190 controls generation and emission of image lights respectively by the right display driver 22 and the left display driver 24.

The display control section 190 transmits control signals to a right LCD control section 211 and a left LCD control section 212 respectively via the transmitters 51 and 52. The display control section 190 transmits control signals respectively to a right backlight control section 201 and a left backlight control section 202.

The image processing section 160 acquires an image signal included in contents and transmits the acquired image signal to receivers 53 and 54 of the display section 20 via the transmitters 51 and 52. The sound processing section 170 acquires a sound signal included in the contents, amplifies the acquired sound signal, and supplies the sound signal to a speaker (not shown in the figure) in a right earphone 32 and a speaker (not shown in the figure) in a left earphone 34 connected to the coupling member 46.

The processing section 167 acquires a captured image from the camera 60 in association with time. The time in this embodiment may or may not be based on a standard time. The processing section 167 calculates a pose of an object (a real object) according to, for example, a nomography matrix. The pose of the object means a spatial relation (a rotational relation) between the camera 60 and the object. The processing section 167 calculates, using the calculated spatial relation and detection values of acceleration and the like detected by the IMU 71, a rotation matrix for converting a coordinate system fixed to the camera 60 to a coordinate system fixed to the IMU 71. The function of the processing section 167 is used for the tracking processing and the AR display processing explained below.

The interface 180 is an input/output interface for connecting various external devices OA, which are supply sources of contents, to the control section 10. Examples of the external devices OA include a storage device having stored therein an AR scenario, a personal computer (Pc), a cellular phone terminal, and a game terminal. As the interface 180, for example, a USB interface, a micro USB interface, and an interface for a memory card can be used.

The display section 20 includes the right display driver 22, the left display driver 24, the right light guide plate 261 functioning as the right optical-image display 26, and the left light guide plate 262 functioning as the left optical-image display 28. The right and left light guide plates 261 and 262 are optical see-through elements that transmit light from real scene.

The right display driver 22 includes the receiver 53 (Rx53), the right backlight control section 201 and a right backlight 221, the right LCD control section 211 and the right LCD 241, and the right projection optical system 251. The right backlight control section 201 and the right backlight 221 function as a light source.

The right LCD control section 211 and the right LCD 241 function as a display element. The display elements and the optical see-through elements described above allow the user to visually perceive an AR image that is displayed by the display elements to be superimposed on the real scene. Note that, in other embodiments, instead of the configuration explained above, the right display driver 22 may include a self-emitting display element such as an organic EL display element or may include a scan-type display element that scans a light beam from a laser diode on a retina. The same applies to the left display driver 24.

The receiver 53 functions as a receiver for serial transmission between the control section 10 and the display section 20. The right backlight control section 201 drives the right backlight 221 on the basis of an input control signal. The right backlight 221 is a light emitting body such as an LED or an electroluminescence (EL) element. The right LCD control section 211 drives the right LCD 241 on the basis of control signals transmitted from the image processing section 160 and the display control section 190. The right LCD 241 is a transmission-type liquid crystal panel on which a plurality of pixels is arranged in a matrix shape.

The right projection optical system 251 is configured by a collimate lens that converts image light emitted from the right LCD 241 into light beams in a parallel state. The right light guide plate 261 functioning as the right optical-image display 26 guides the image light output from the right projection optical system 251 to the right eye RE of the user while reflecting the image light along a predetermined optical path. Note that the left display driver 24 has a configuration same as the configuration of the right display driver 22 and corresponds to the left eye LE of the user. Therefore, explanation of the left display driver 24 is omitted.

The device to which the technology disclosed as an embodiment is applied may be an imaging device other than an HMD. For example, the device may be an imaging device that has no function of displaying an image.

Figure 3:
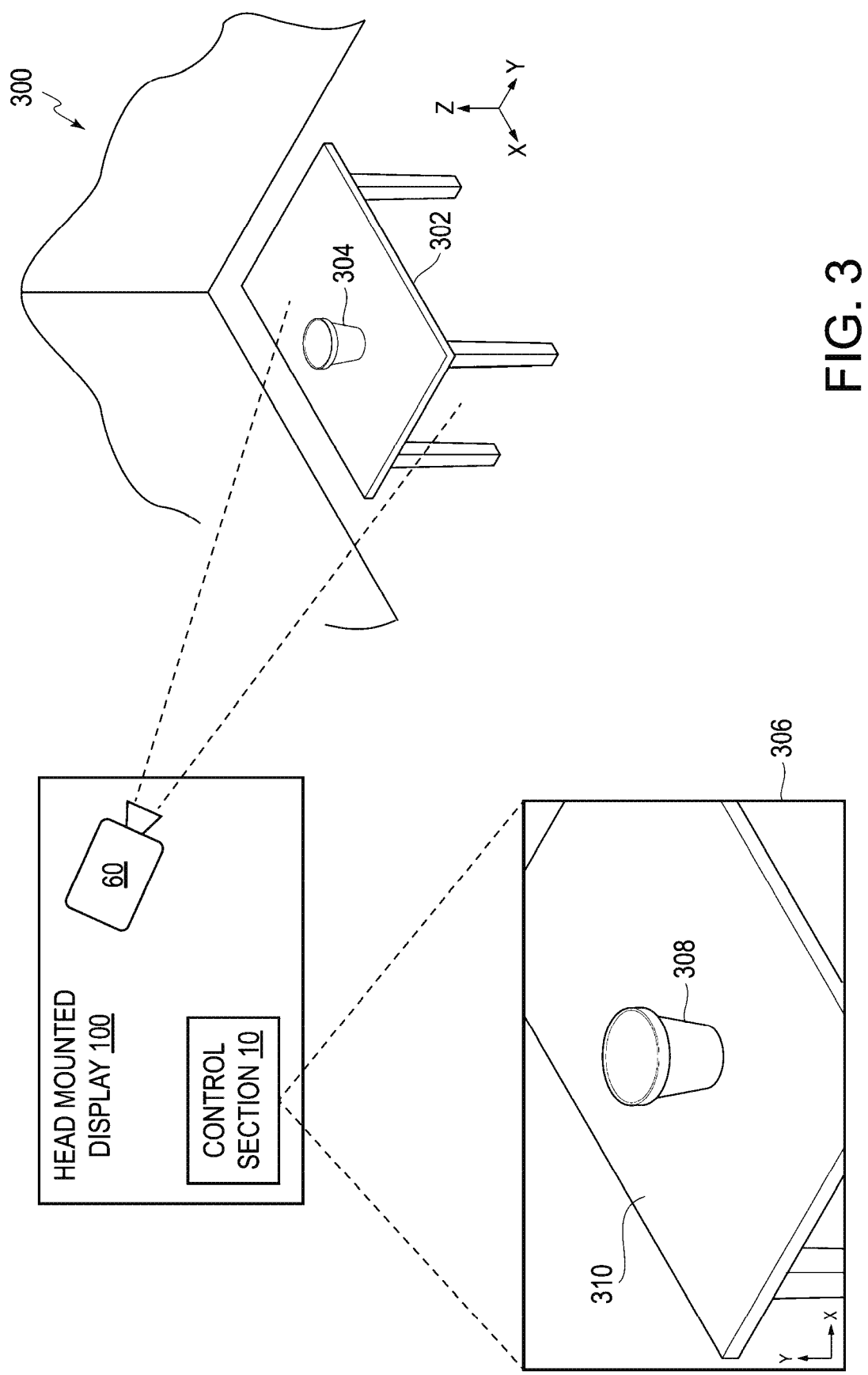
FIG. 3 is a diagram illustrating use of the HMD shown in FIGS. 1 and 2 in a three dimensional (3D) real-world scene.

FIG. 3 is a diagram illustrating use of the HMD 100 in a three dimensional (3D) real-world scene 300. Scene 300 includes a table 302 and an object 304 on the table 302. A user (not shown) wearing HMD 100 is positioned to view the scene 300. The camera 60 of the HMD 100 also views the scene 300 from approximately the same viewpoint as the user. The camera 60 captures images of the scene 300 from the viewpoint and provides an image data stream to the control section 10. The image data stream includes multiple temporally separate two dimensional (2D) image frames. FIG. 3 includes an example image frame 306, sometimes referred to as an image, received by the control section 10. The image frame 306 includes a representation 308 of the object 304 as viewed from the camera's viewpoint and a representation 310 of a portion of the table 302. A representation of an object, such as the representation 308 of object 304, in an image frame is sometimes also referred to herein as the object in the image frame.

The control section 10 initially attempts to locate the representation 308 of the object 304 in the image frame 306 and determine its pose. The control section 10 then attempts to track the representation 308 of the object 304 and update the pose of the object through subsequent image frames.

As discussed above, the CPU 140 shown in FIG. 2 is configured to receive the image frames 306 from the camera 60 of the HMD 100. Based on the detection and tracking of the object 304, the CPU 140 can process the image frames 306 to create AR output. However, as discussed below, various different configurations may be incorporated in the CPU 140 to allow the CPU 140 to better detect and track certain types of objects. As mentioned below, the selection of algorithms for detecting and tracking objections is not intuitive, and therefore the disclosure provides recommendations for an AR software developer regarding which algorithms might be the best fit for the objects that might be detected/tracked.

Introduction to the Pipeline Recommendation System

The following disclosure describes systems and methods that perform processes that will eventually lead to the instructions/processes that are executed by the CPU 140. The processes, based on a determination of a recommended pipeline, are to be executed by a device, the CPU 140, the camera 60, etc.

As an introduction, an originating entity (e.g., a manufacturer) develops an AR software development kit (AR SDK) which may include one or more pipelines for an OD/PE/Tracking task. The entity may also develop a recommendation system which recommends typically one of the pipelines in the AR SDK based data representing or corresponding to a real object to be used as a target in the OD/PE/Tracking task. The AR SDK and the recommender system can be submitted to an AR software developer, who may want to develop an AR software product which performs an OD/PE/Tracking task with respect to its own real object. Then the developer can select one of the pipelines suitable for its object, employing the recommendation system which recommends one pipeline from among the ones included in the AR SDK.

An AR SDK has a core library that has core chip technology. The developer sees the SDK and a Windows application, which is used to help the developer set up their augmented reality (AR) application. The developer goes through a series of processes with the help of the SDK with the recommender system of the present disclosure to configure the application. After the AR application is developed, the application can be deployed on a user device, such as a BT device.

After selecting a real object to be used as a target which is to be detected and/or tracked by its AR software product, the developer generate training input data representing, or corresponding to, the object, which is to be used by a processor running the AR software product to detect and/or track the object in image frames captured by a camera. The training input data may include at least one of (i) a 3D model corresponding to the real object, (ii) at least one synthetic image obtained by rendering the 3D model from a view, or viewpoint, (iii) at least one real image of the real object taken from a view, (iv) template data per view including 2D feature elements extracted from the synthetic image and/or the real image. The real image can be taken with the camera 60 on the head-mounted device (HMD) 100.

In some embodiments, the originating entity may use a calibration marker, such as a measurement grid on a table, next to which the object can be placed, to derive a pose which can be used as the ground truth, or a reference pose, to generate performance data described later.

During the process of configuring the tracker for use with the developer's application, the developer may come to a point where he must choose between two or more configurations, or algorithms, which might be used to perform OD/PE/Tracking task. However, it may be difficult for any developer to know which algorithm to choose that might provide the best results for their object.

Thus, with the dilemma that the developer faces regarding which algorithm for OD/PE/Tracking task to choose, the present disclosure provides a solution. A first purpose of the present disclosure is to provide a recommendation or selection to the developer and/or an end user for choosing one of any number of possible configurations (or algorithms) that can be predicted as being the best fit for the given object. Another purpose of the present disclosure is to indicate to the developer and/or an end user whether the given dataset of image data is of high quality, medium quality, or low quality. The quality of the data may be indicated by a score.

Considering the different possible configurations of the OD/PE/Tracking system that may be used in the AR SDK, each enumerated configuration may be defined as a pipeline. For example, a pipeline may be a configuration of the OD/PE/Tracking system that consists of:
  1. A selection of assignments to system parameters;
  2. A selection of software system components from which to compose the OD/PE/Tracking system; or
  3. Some combination of both (1) and (2).

The term "training input data" or "training data" may refer to a data set used to prepare an OD/PE/Tracking system for 3D Object Detection and/or Pose Estimation and/or Tracking of some object. Besides the description above, in another embodiment, training input data may include at least one of: 1) a CAD model that may or may not include texture knowledge, 2) one or more labeled synthetic and/or real images containing a view of the object, and 3) a pose as the label. Training input data may be a part of the application domain of an AR Tracking Application.

Embodiments of the present application may be provided for recommending a pipeline based on a priori knowledge about OD/PE/Tracking system performance as well as some basic analysis of such training data representing, or corresponding to, a given object to determine whether or not such training data, or the object, should be used with a particular algorithm for OD/PE/Tracking task such as Rich Feature OD/PE or Low Feature OD/PE.

Thus, in the embodiments, pipeline recommendations can be based on performance, or experience on the actual performance of the configuration when used in an actual environment with particular training input data. To determine performance, the following disclosure describes an estimation process based on the complexity of the geometric characteristics of the object being tracked.

Figure 5:
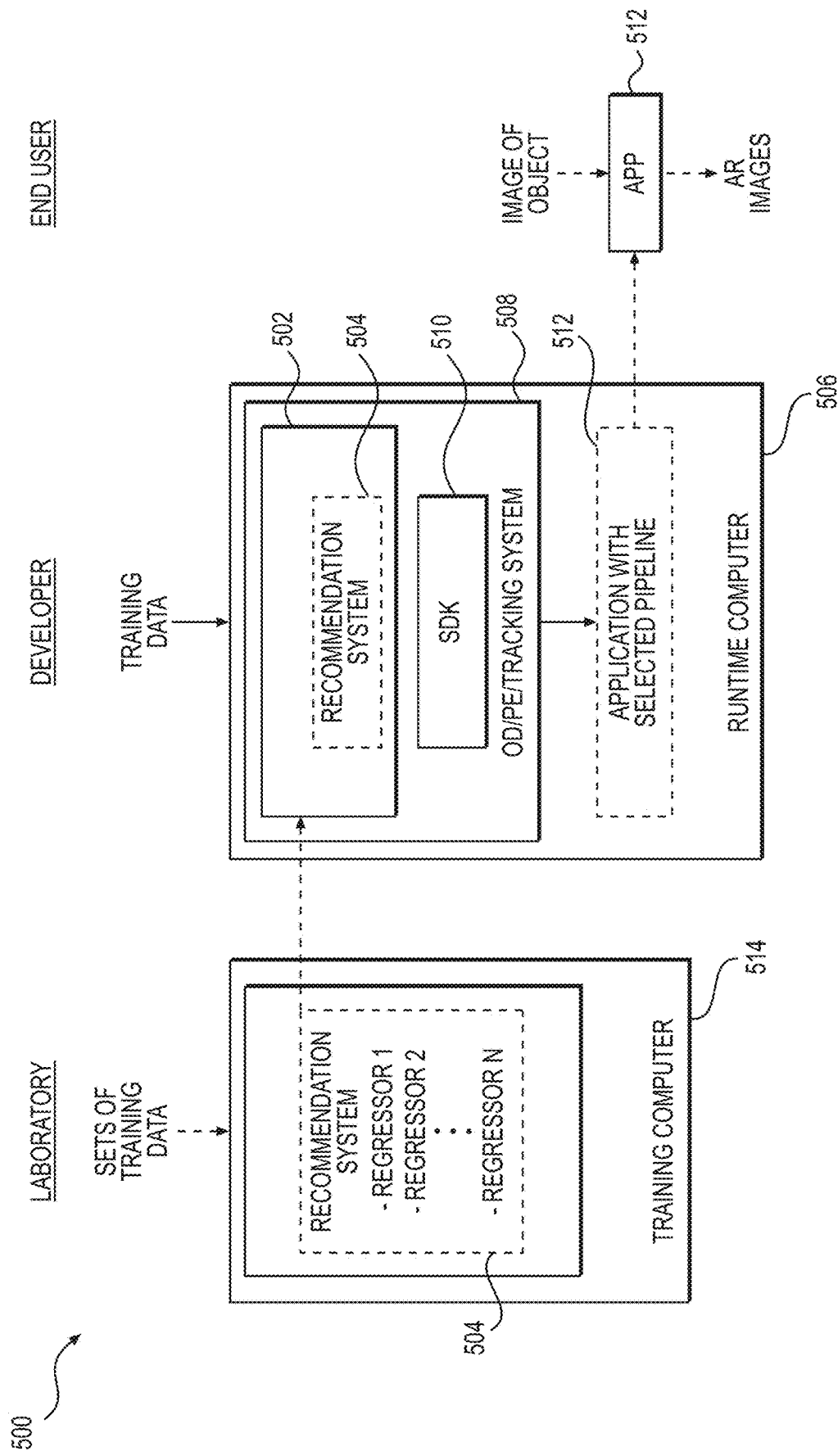
FIG. 5 is a diagram illustrating an embodiment of a system in laboratory/development/user settings for creating and using a training tool.

FIG. 5 is a diagram illustrating an embodiment of a system 500. The system 500 includes (i) a training computer 514 for training a recommendation system 504, and (ii) a runtime computer 506 that runs the trained recommendation system 504. FIG. 5 also shows an AR software product 512 having a pipeline recommended by the recommendation system. The AR software product 512 is to be implemented for example on the HMD 100.

The recommendation system 504 has a number of regressors (regressors 1, 2, . . . N). For example, a regressor may include a process of using a set of evaluation results (CDRs) for a variety of objects, training data, etc., captured under a variety of environmental conditions, and using the evaluation results, along with corresponding OD/PE/tracking training data used in the evaluation, to compute a regression function using a regression method. In one embodiment, a regression function may be computed by a Random Forest. In another embodiment, the regressors as a whole in the recommendation system 504 may be replaced with a deep neural network algorithm model.

Once the recommendation system 504 is trained by the training computer 514, a developer, in a developer environment, may utilize a runtime computer 506 to perform the recommendation system 504. The recommendation system 502 recommends to the developer what configuration (e.g., algorithms, models, etc.) of the OD/PE/tracking system 508 that may be best to use with the OD/PE/tracking training input data.

After the developer develops the AR software product 512 with a selected pipeline, the AR software product 512 can be deployed for use by an end user in an end user environment together with the training input data. The end user can then obtain images of an object (e.g., by using a camera on a head-mounted display (HMD) device a smartphone, a tablet computer, a robot or any other device referred to herein as a pose derivation device). The images are processed by the AR software product 512 that uses the pipeline equipped with the training input data to detect an object, estimate its pose and/or track the pose, so as to obtain AR images that can be displayed at a pose consistent with the object pose to the user (e.g., on the HMD device or any other device that has a camera).

In one method, performance prediction can be used to recommend to the developer (or to end user in some embodiments) the best OD/PE/tracking pipeline to use with the OD/PE/tracking training input data set provided by the developer (or end user). The method may run a performance model of each pipeline on the training input data using the training computer 514, and then recommends the pipeline associated with the selected model that gives the highest score.

To construct the performance models, a statistical learning approach (e.g., machine learning) can be used. Each performance model may be configured as a "regressor" learned from performance evaluation results, which are produced from performance evaluation experiments conducted in the controlled laboratory environment.

Training the Regressors

The OD/PE/Tracking training input data set and its corresponding performance evaluation results (or performance data set) of a particular pipeline are employed to train a regressor that predicts a score in a bounded range (e.g. 0-1), indicating suitability of the pipeline to be used with the OD/PE/Tracking training input data set. Similarly, the OD/PE/Tracking training input data set and its corresponding performance data set of another pipeline are also employed to train another regressor. Note, in another embodiment, a feature vector, which is described in detail later, may be estimated from the training input data set, and may be used together with its corresponding performance data set to train the regressors. The resultant trained regressor is used to compute the score, used to label the quality of the performance of a particular configuration of the OD/PE/Tracking system for a given set of input training data. The label is what is learned by the regressor, and is explained below. Then, given some OD/PE/Tracking training input data set during a runtime, a regressor that is trained correctly is expected to:

produce a good score (i.e., a score greater than a threshold) if its associated pipeline has strong performance when trained on the data set; and produce a bad score (i.e., a score less than a threshold) if its associated pipeline has weak performance.

Thus, there may be two different kinds of training. One kind of training, according to present disclosure, involves collecting OD/PE training data, which is used to train an OD/PE or tracking system to perform OD/PE or tracking processes in an AR application. Another kind of training involves training a regressor to predict the performance of the OD/PE or tracking system if the OD/PE training data collected in the first kind of training were to be used to perform the first kind of training.

In the first kind of training, a software developer intends to train an OD/PE or tracking system. The software developer collects a set of training views (e.g., images and poses) of some chosen object, and then uses it to prepare the OD/PE or tracking system for operation. This training can be performed with a training tool. The second kind of training involves training a regressor and depends on evaluation results collected in the laboratory on a number of different objects.

Labeling or Performance Data

Here are more detailed descriptions about how performance data is generated. The score used as the label is generated using an internal system for conducting performance evaluations, which may be called an evaluation framework. The evaluation framework disclosed in the present application includes input data and output data. All of the pipelines can be run on all the input data to produce output data, or performance data, which can be referred to as "executing" the framework. The data involved may include:

Input Data. The input data includes:

A variety of sets of OD/PE/Tracking training input data, representing, or corresponding to, objects with a variety of featureness. Some are highly rich in features, which can be referred to as "rich feature" objects. Others are poor in features, which can be referred to as "low feature" objects. Others are moderately featured, and for which it is difficult to describe definitely as either "rich-feature" or "low-feature."

Evaluation Test Data includes video sequences produced by a camera (on a head mounted device) moving in a wide variety of manners around many different kinds of objects (having varied featureness) and under a variety of illumination conditions. Associated with each frame of each video sequence is ground truth, describing the true pose of each object in each frame.

Output Data. When the framework is executed, each pipeline produces a pose estimate for each object in each image, and the results are compared with ground truth to decide quality of the performance. The quality of performance is defined as the Correct Detection Rate (CDR), which is the rate of "correct" detections in a sequence. As disclosed herein, "correct" may refer to a pose estimate that satisfies the requirements/thresholds defined for the AR SDK in the AR SDK's product specification. In the present embodiment, the output data is also referred to as performance data.

Method for Training Regressors

Figure 7:
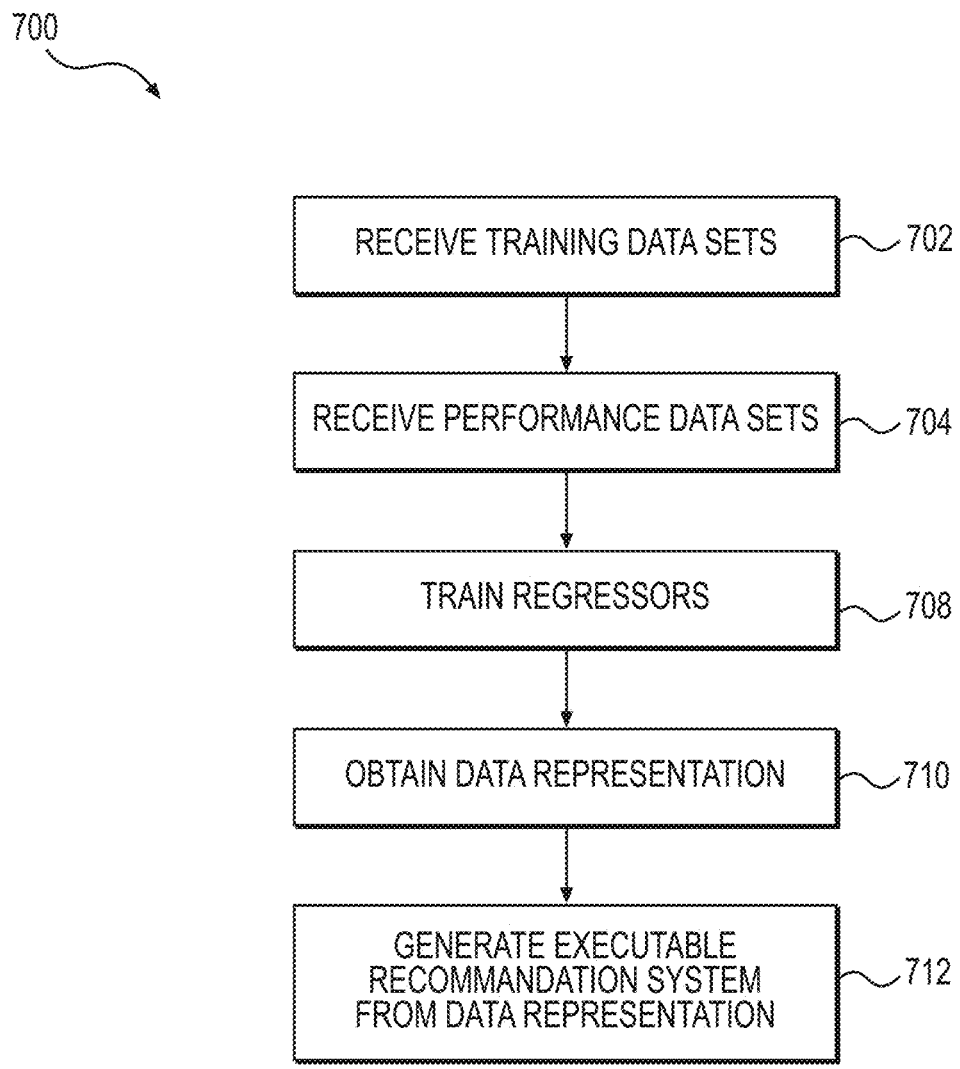
FIG. 7 is a flow diagram illustrating an embodiment of a method for carrying out the details of the present application.

FIG. 7 illustrates an embodiment of a method 700, which shows carrying out the details of embodiments of the present application. The method 700 may be intended specifically for the 3D Object Tracking system that is delivered with an AR SDK.

The training process can take place in the laboratory (i.e., prior to delivery to the developer).

In some embodiments, an AR application software product developed by a developer may include a plurality of pipelines or algorithms for an OD/PE/Tracking task. In this case, a recommendation may be passed along from the developer to the end user software. The end user may be given the choice about which algorithm to use. However, an end user would likely have less knowledge than the developer regarding how the different algorithms would perform for the end user's objects. Thus, an end user can obtain the benefit of a recommendation system of the present disclosure. In this case, the third step of choosing a configuration, as mentioned above, would be eliminated for the developer and the responsibility would be transferred to the end user.

The method 700 includes creating training data sets, as indicated in block 702. The method 700 also generates performance data, as indicated in block 702. In blocks 700 and 702, data is created with respect to all the pipelines using various objects. Then the method 700 trains the regressors, in block 708. In block 708, one regressor is trained with respect to one pipeline using all training input data of the available objects. When the training of the regressors is completed, data representing each regressor is determined and stored in a memory of the training computer 506 (FIG. 5), as indicated in block 710. Then, the method 700 generates and stores an executable recommendation system 502 in a memory of the training computer.

In the example where the algorithms are Random Forest models, a set of decision trees (e.g., if/then branches) can be established. The model can test against a threshold, choose a branch, store the training data in memory, which represents the model, and then apply to make a decision to compare with the memory.

In an example with a neural network, the architecture of the neural network should be distinguished from weights used to train the neural network. A representation inside the computer may be different from a model and depends on the technique used.

For a neural network, there may be two ways to train. First, imagine that a computer program includes 100 sets of "if/then" statement branches. After choosing the branches of the decision tree, an interpolation can be performed in the case of a regressor. Second, consider the first example except that instead of branching, a dynamic memory is obtained. A tree data structure where branches are linked by pointers in memory, traversals are performed in a comparison process. Although, these produce the same result, each may be a better fit for a certain type of object.

Training a model involves constructing the decision trees. Different from a neural network that might start with an architecture, a procedure can be followed to decide what the weights are going to be, but the structure does not change.

Running the Regressors

Then, the set of trained regressors are composed into the recommendation system 504. The recommendation system 504 accepts an OD/PE/Tracking training data set as input, runs every regressor on the same training data set, and obtains each regressor's score. The recommendation system 504 then returns as a recommendation the pipeline associated with the regressor that produced the best score. It is expected that the regressor associated with the most accurate pipeline on the training data set shall return the highest score amongst all regressors.

Figure 6:
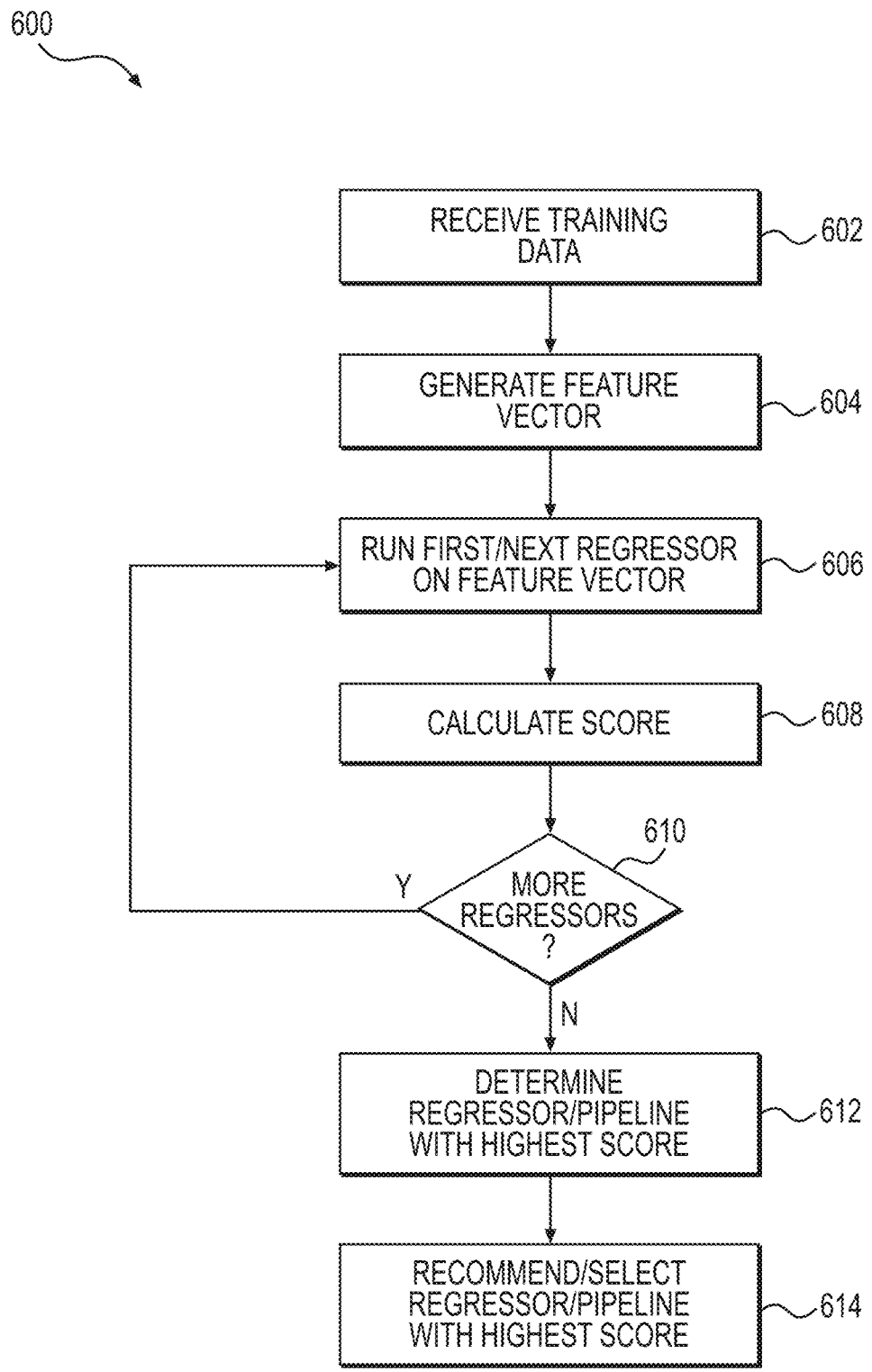
FIG. 6 is a flow diagram showing an embodiment of a method employed by a recommendation system of the training tool shown in FIG. 5.

FIG. 6 is a flow diagram showing an embodiment of a method 600 employed by the recommendation system 502 during the runtime. The method 600 includes receiving training data, as indicated in block 602.

In the present embodiment, the method 600 may include generating a feature vector based on the training input data, as indicated in block 604. The method 600 includes running each of the regressors using the feature vector which is based on the training input data set.

In this embodiment, the regressor is trained using the feature vector as input.

Each feature vector includes (but is not limited to) information computed as follows. First, for each object or 3D model corresponding to the object, a MC score is computed (and a normalized histogram of Local Binary Patterns may be used). Specifically in the embodiment, for each 3D model (e.g., stereolithography (STL) CAD model), a value is computed that characterizes the complexity of the shape defined by the 3D model, such as the number of faces of the 3D model, the faces being grouped by degrees how they approximate to a plane. The object's size in the synthetic image is then computed as the proportion of image pixels that contain the object. Finally, for each of training input data sets, which includes synthetic images, ground truth poses per image, and a 3D model, the components of the feature vector are constructed to include:

Average MC score components, where each component is an average of one of the components in the MC score of a 3D model, synthetic and/or real images the training input data set;

Components that represent a normalized histogram, that aggregates over the normalized Local Binary Pattern histograms of each image in the training input data set;

A component that holds the average of the object's size in each image of the training input data set.

As indicated in block 606 of method 600, a first regressor runs on the feature vectors and its corresponding performance data set with respect to a particular pipeline, and at block 608, a score (e.g., CDR score), is calculated (the score is discussed in more depth later here).

Referring back to FIG. 6, in decision block 610, the system determines if the performance of each of the available regressors has been analyzed on the training input data set. In other words, the system determines if any additional regressors have not yet been run/analyzed.

If there are more regressors are to be run/analyzed, the method 600 returns back to block 606. If so, the next regressor is run and steps 606 through 610 may be repeated as necessary. When no more regressors are to be run/analyzed, the method 600 may proceed from decision block 610 to block 612.

As indicated in block 612, the method 600 includes determining which one of the plurality of regressors on their respective pipelines has the highest score. For example, the scores, such as the CDR scores of the respective regressors, can be compared with each other.

In some embodiments, the present disclosure may include any number of processing pipelines, where each processing pipeline may be configured to perform a sequence of processing steps at one time. Each pipeline represents an algorithm or regressor for processing the image data. Some pipelines will be able to provide better object detection than others, some pipelines will be able to provide better pose estimation than others, and some pipelines will be able to provide better object tracking than others. From the results of OD, PE, and/or tracking, the pipelines are evaluated, such as by calculating a score, whereby the scores can then be used to determine which pipeline (and essentially the algorithm) best fits the particular object being detected and tracked.

With the highest score determined for one of the regressors, the method 600 includes recommending/selecting the regressor and corresponding pipeline having the highest score, as indicated in block 614.

A rich feature pipeline may be used that relies more on a plurality of points on the object. A low feature pipeline may be used that relies more on edges of the object. One pipeline is not necessary always better than the other; they are just different from each other. Again, it should be noted that it may be difficult for a developer to know which pipeline would be best for a specific object. The present disclosure uses a performance estimation process to determine which pipeline might work the best for the specific object. The recommendation system 504 provides a recommendation or selection of one of the pipelines that provides a best fit. Thus, the present disclosure provides an improvement in the industry to provide the best pipeline recommendation to the software developer.

Although the recommendation is considered to be the best possible fit for an object, the developer can override the recommendation and decide to use another pipeline. The recommendation, in some cases, may be an automatic selection of a best fit pipeline for a given set of image data. The recommendation may include configuring, selecting, and/or choosing a configuration that is a best fit.

After receiving the recommendation, the developer may use the recommended pipeline for developing the software for the AR application software and AR device. The developer develops the AR application software with the SDK and produces a program that is to run on the device that has some occupational or recreation task. Essentially, the selection of the recommended pipeline involves storing the pipeline and using the pipeline for further tracking. The recommendation system decides which ones of the plurality of pipelines will be used in the developer's application. Although the developer may opt against this recommendation, it should again be noted that the developer will likely not understand which pipelines will be best for tracking the user's objects. It is noted that the developer may build the AR application software product so that it includes all the pipelines available from the SDK, and enable the AR software product to select one of the pipelines in response to the recommendation on an end user side by passing on the recommendation together with the training data set to the end users.

Since the developer is mainly responsible for determining what the end user is going to see, the recommendation system of the present disclosure helps the developer to focus his efforts on this task, without having to gain knowledge with respect to how tracking might work with different pipelines. All the developer would need to do is generate training input data and then tracking can be performed.

In the method 600 of the present disclosure, a detailed process is provided for predicting the performance of different types of OD/PE/Tracking systems, including the method of training the regressors that do prediction using OD/PE/Tracking training input data in an offline manner (i.e., while not tracking an object). The approach to recommendation involves performance prediction of more than one pipeline simultaneously in a single system.

A pipeline can be evaluated using a classifier, which is an algorithm (e.g., a regressor) that is trained based on results for evaluating the performance of that pipeline. If it is determined that the pipeline has good performance, or better performance than other pipelines, than this pipeline is recommended. In some cases, the best pipeline is automatically selected for the developer. One regressor does not know how the other regressor may be performing until a comparison is made to determine which regressor is the best fit for the object. In the present embodiments, the term regressor is defined as including a regressor and a classifier.

Each regressor performs regression. When performance of the pipeline is measured, an evaluation metric is computed to determine how accurate the pipeline is. For example, the evaluation metric may include CDR, which essentially is a percentage of correctly estimated values detected by the algorithm. The regressors predict CDR and evaluate what the CDR would be for each pipeline. To evaluate a pipeline, CDR is computed.

The regressors include a learning process to predict what an evaluation would have been for the training input data corresponding to an object that the user provides for the particular pipeline in question. The recommendation system then compares the prediction scores to determine which pipeline would be best.

The regressors are used based on what the evaluations would have been if the evaluation processes were to be followed for the given data. The evaluation process is used to train the regressors. The performance data is the outcome of taking video sequences of inputs supplied to a tracker, running it under the different configurations, computing CDR, and then supplying the CDR along with the training input data, or the feature vector computed from the training input data to each regressor for training. The regressor learns the evaluation of an object through the training input data and performance of a pipeline with respect to the object.

Regression is a statistical analysis. The regressor, which may be a type of artificial intelligence (AI), performs the regression analysis. The regressors are algorithms that may use a Random Forest and include machine learning. Each algorithm can provide a classification output or can predict a value. Like with linear regression that fits a line, the regression of the present disclosure fits the data performance data to an irregular function. From the perspective of a machine learning engineer, the function has the properties of a regressor. Data representing, or corresponding to, an object, and its performance data with respect to a particular pipeline are used to create a function that computes a value y from inputs x (i.e., y=f(x)).

Another performance prediction embodiment may include a different method for predicting the performance of a vote-based object recognition system. This embodiment may determine a limit on the achievable performance for a vote-based recognition method.

Regarding the tracking of objects, there are two main parts. The first part, referred to as detection, includes estimating the pose of an object with no prior information about the pose. Then, once detection of the object's pose is determined, a second part, referred to as tracking, includes estimating the pose of the object image based on prior information about the pose. It should be noted that the pipelines have both detection and tracking methodologies.

An alternative embodiment may include a system with a single classifier trained in a manner similar to the training methods disclosed in the present application. One possible limitation of the alternative embodiment, however, may be that whenever a design change is made to one of the pipelines of the OD/PE/Tracking system, the classifier may need to be retrained. Retraining the systems of the present application may be simpler since only the regressor associated with the changed pipeline would require retraining.

Also, the systems of the present application may solve the learning problem in a simpler manner than in the alternative embodiment, since the parameter space may be smaller, thus affording a simpler architecture.

According to some typical situations, a developer might need to 1) collect training data, 2) try performing pose estimation (or alignment) with several configurations, and 3) choose a configuration or algorithmic model (regressor) for performing tracking. However, according to the embodiments of the present disclosure, the developer can obtain a recommendation without the second step.

The machine learning algorithm used for the regressor may be a Random Forest algorithm, as mentioned above, but in some embodiments, a python machine learning package (e.g., scikit-learn) may be used to learn Random Forests on feature vectors and evaluation scores.

Note that the recommendation system may also use the computed information for a goal that is different from pipeline recommendation. The features, histograms, metrics, etc., computed per image or per model, may also be used for "performance prediction", in which the recommendation system provides guidance to the user about how suitable individual training input data is for a given pipeline. If a user decides that the training input data is not suitable enough for his purposes, he may choose to re-collect the training input data. Although this does not exactly serve the same purpose as pipeline recommendation, the two different goals may be related.

The evaluation framework may be implemented in python, making it easy to use scikit-learn to train the Random Forest inside a python environment. After the two regressors are trained, the python environment contains Random Forest objects in memory. Another script then loads the Random Forest objects and generates efficient C++ source code that implements the Random Forests in C++. The C++ code is then included in the source code for the recommendation system that accompanies the AR SDK.

The description of the various embodiments is provided above. Below, the disclosure summarizes various aspects and benefits of the various embodiments. The below description also includes greater detail of training and recommendation features as well as a discussion of the scoring.

Feature Vector

Figure 8:
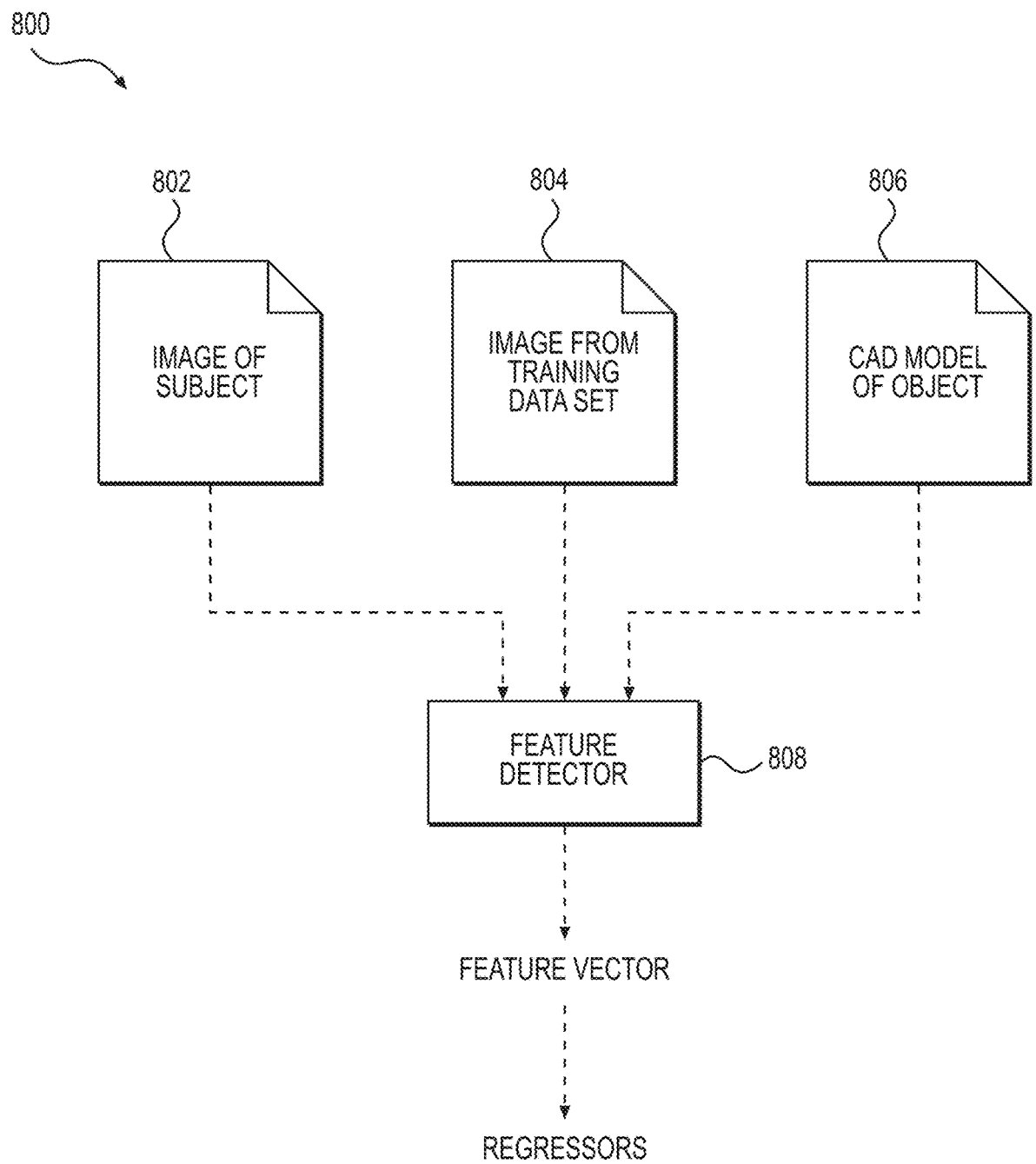
FIG. 8 is a diagram illustrating a flow of data for creating regressors.

FIG. 8 is a diagram illustrating a system 800 showing the flow of data to create the feature vectors based on the training input data. The training data sets are supplied to a feature detector 808, which produces a feature vector from one or more real and/or synthetic images 804 and CAD models 806 in training data sets. The feature vector can then be supplied to the regressors for training.

An example of generating a feature vector based on training input data is described below. According to the present embodiment, the feature vector includes some elements that account for complexity of a target object represented by a corresponding 3D model.

An aggregated metric (MC Score) may be used elements in the feature vector. Also, the number of 2D features, such as corners and edges, extracted from real and/or synthetic images may be elements of the feature vector.

Geometric complexity is described by the proportion of surfaces which are medium (M), irregular (I), boundary (B), or smooth (S), hereinafter "MIBS." The average distance between every 3D point in a patch and its best fit plane is categorized by MIBS. For example, boundary patches (B) are those that contain the object in more than 5% of its points and less than 95% of its points.

The following table describes the categorization:

| Patch type | Condition |
|---|---|
| Medium | 0.5% object size < Average distance < 2% object size |
| Irregular | Average distance > 2% object size |
| Boundary | 5% patch size < Points containing object < 95% patch size |
| Smooth | Average distance < 0.5% object size |

The MIBS score is the proportion of patches belonging to each type, consisting of four numbers. For example, the MIBS score may include medium=0.1, irregular=0.05, boundary=0.45, smooth=0.4. If a patch fits both the boundary condition and another condition, the patch will be considered a "boundary" patch.

The MIBS score is combined with the number of 2D features, in one embodiment corner features, to produce the MC Score. MC score takes into account both object geometric complexity and richness of features on the object Quantifying Object Complexity The factors to determine object complexity (e.g., by calculating the MIBS score) are the CAD model and the pose of the object in the camera frame of reference. First, the object is rendered in the camera frame of reference to obtain the region of interest (ROI) that does not contain the background. This ROI is divided into patches by dividing the length and width of the ROI into equally spaced grids. For example, the ROI may be divided into 20 rows and 20 columns.

Figure 4:
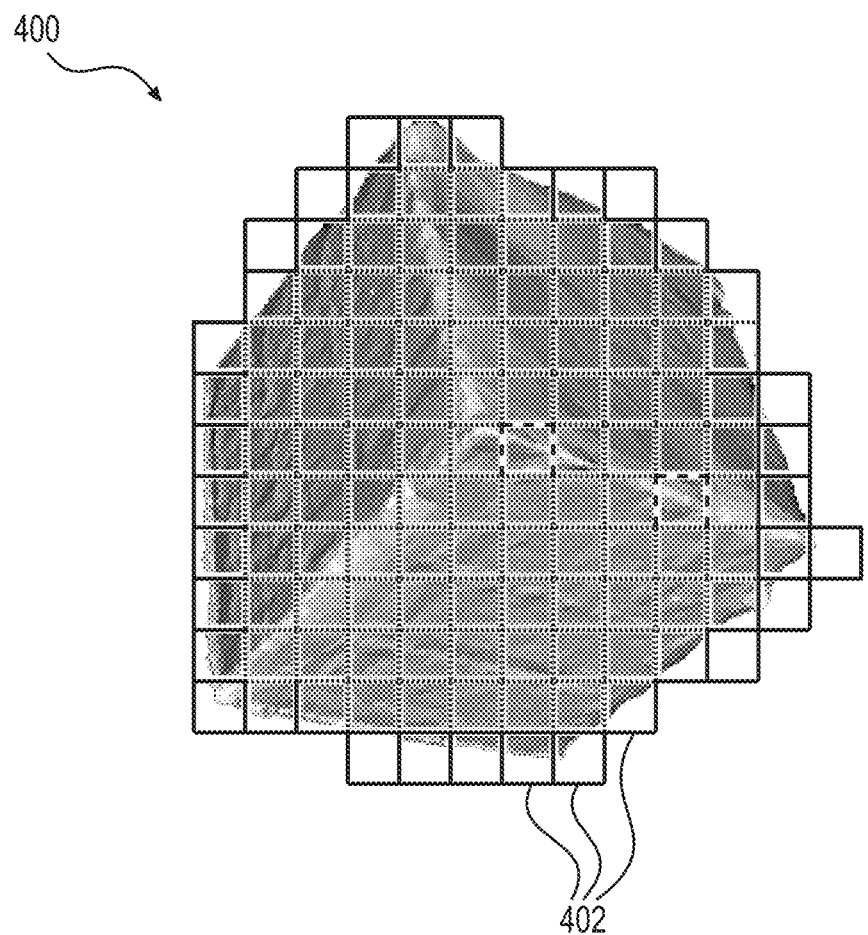
FIG. 4 is a diagram showing an example of rendering and patches for a cube.

FIG. 4 shows an example of the rendering and obtaining of patches for a cube 400. Each patch 402 in FIG. 4 may be the same size and may contain a set of 2D points in pixel coordinates. (It should be noted that the patches 402 do not necessarily need to be square and may be any shape or size.) For each patch 402, each 2D point is transformed into the CAD model frame of reference to make a set of 3D points. A plane will be calculated as a best fit for each patch 402 and will be categorized by how well the plane fits the 3D points in the patch 402.

Determining the best fit plane is a way to describe object geometry because a plane has a perfectly smooth surface, and points that fit a plane well tend to belong to smooth patches. On the other hand, points belonging to surfaces that are rough or bumpy will have a large geometric distance relative to the best fit plane.

Given a set of N 3D points, $\{P_k\}_{k=1}^{N}$, a plane can be defined with the plane equation $Ax+By+Cz+D=0$ that minimizes the geometric error between the set of N points and the plane:

$$C = \min \|P \cdot [A,B,C,D]^T\| \quad (1)$$

where P is a matrix containing the coordinates of the set of points:

$$P = \begin{bmatrix} x_1, y_1, z_1, 1 \\ x_2, y_2, z_2, 1 \\ \cdots \\ x_N, y_N, z_N, 1 \end{bmatrix}$$

The calculation of the best fit plane can be solved with single value decomposition (SVD). In one implementation, an approximation can be made to approximate the best fit plane.

To solve a linear least squares equation, YX=b, for X, with an over-determined system of m linear equations with n unknown coefficients, the following can be used:

$$X = (Y^T Y)^{-1} Y^T \quad (2)$$

where $$Y = \begin{bmatrix} Y_{11}, Y_{12}, \ldots, Y_{1n} \\ Y_{21}, Y_{22}, \ldots, Y_{2n} \\ \cdots \\ Y_{m1}, Y_{m2}, \ldots, Y_{mn} \end{bmatrix} \quad X = \begin{bmatrix} X_1 \\ X_2 \\ \cdots \\ X_n \end{bmatrix} \quad b = \begin{bmatrix} b_1 \\ b_2 \\ \cdots \\ b_m \end{bmatrix} \quad [3]$$

This can be applied to the best fit plane calculation by assuming that A=1 from the plane equation. For example, when By+Cz+D=0, the least squares equation becomes:

$$Y = \begin{bmatrix} y_1, z_1, 1 \\ y_2, z_2, 1 \\ \cdots \\ y_N, z_N, 1 \end{bmatrix} \quad X = \begin{bmatrix} B \\ C \\ D \end{bmatrix} \quad b = \begin{bmatrix} -x_1 \\ -x_2 \\ \cdots \\ -x_N \end{bmatrix}$$

Thus the plane with A=1 can be solved with equation (2) above. This is repeated for the assumption that B=1, C=1 and D=1, to obtain four planes. The best fit plane is chosen from these four planes as the plane with the minimum average geometric distance to the points.

The geometric distance between a plane described by Ax+By+Cz+D=0 and a 3D point $(x_0, y_0, z_0)$ can be calculated by:

$$d = \frac{|Ax_0 + By_0 + Cz_0 + D|}{\sqrt{A^2 + B^2 + C^2}} \quad (4)$$

The arithmetic average of the distance between every 3D point in a patch and their best fit plane is recorded. This average of distance is used to categorize the patch to obtain the MIBS score.

If a patch fits the boundary and another condition, the patch will be considered a boundary patch. The MIBS score is the proportion of patches belonging to each type, consisting of four numbers (e.g., M=0.1, I=0.05, B=0.45, S=0.4). In MC, there is a fifth number computed: the number of corner features detected in the region of the image containing the object. The first four features of MC are the "MIBS" features and the fifth one is corner features. In other embodiments, corner features may be "ORB" features.

The numbers thus calculated can be part of elements in the feature vector. The additionally, the number of 2D features such as corners, or edges extracted from real and/or synthetic images may be additional element of the feature vector.

According to some embodiments, the present disclosure may include systems and/or methods for providing recommendations about which configuration of an OD/PE/Tracking system is best to use for a given set of OD/PE/Tracking training data. A method may include using a machine learning algorithm for training regressors used in the recommendations. Regressors may refer to algorithms within a pipeline for performing a regression process to track objects.

Additional Uses of the Computed Features

The training tool also uses the computed information that was described with respect to the feature vector in another part of the system. For example, the training tool may be used for a goal that is different from pipeline recommendation. The features, histograms, metrics, etc., computed per image or per model are also used for "performance prediction," in which the training tool provides guidance to the user about how suitable individual training images are for a given pipeline. If a user decides that the training images are not suitable enough for his purpose, he may choose to re-collect the training input data. Although this does not exactly serve the same purpose as pipeline recommendation, it is believed that the two different goals may be related.

Tracking of an object is based on an optical flow or other properties of motion (e.g., image motion data). Then, using a CAD model of the object, where lines might be expected to appear, a refinement of the pose estimation can be made.

Although the invention has been described with reference to embodiments disclosed herein, the embodiments do not limit the scope of the invention. Modifications to those embodiments or different embodiments may fall within the scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "has," "have," "having," "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The explicit description of the present invention has been presented for purposes of illustration and description, but is not intended to be exhaustive or limited to embodiments of the invention in the form explicitly disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A non-transitory computer readable medium for storing instructions that enable one or more processors to:
    train a first regressor on the basis of (i) training input data sets of test objects and (ii) first performance data sets indicating performances of a first pipeline, so that the first regressor predicts the first performance data sets of the first pipeline when the respective training input data sets are input to the first regressor,
    wherein the first performance data sets include first correct detection rates of first poses of the test objects over respective reference poses of the test objects, the first poses of the test objects being derived by a pose derivation device running the first pipeline to derive the first poses based on the respective training input data sets and respective images of the test objects captured by a camera, and,
    train a second regressor on the basis of (iii) the training input data sets of the test objects and (iv) second performance data sets indicating performances of a second pipeline, so that the second regressor predicts the second performance data sets when the respective training input data sets are input to the second regressor,
    wherein the second performance data sets include second correct detection rates of second poses of the test objects over the respective reference poses of the test objects, the second poses of the test objects being derived by the pose derivation device running the second pipeline different from the first pipeline to derive the second poses based on the respective training input data sets and the respective images of the test objects captured by the camera.

2. The non-transitory computer readable medium of claim 1, further configured for storing instructions that enable the one or more processors to:
    store the first and second regressors in a training tool of a software development kit (SDK) for assisting an application developer develop an augmented reality application.

3. The non-transitory computer readable medium of claim 1, further configured for storing instructions that enable the one or more processors to:
    train at least one additional regressor, different from the first and second regressors, on the basis of (v) the training input data sets of the test objects and (vi) third performance data sets, so that the at least one additional regressor output data that approximates to the third performance data sets when the training input data sets are input thereto,
    wherein the third performance data sets are based on a third pose and the reference pose of each test object, the third pose of each test object being obtained from the pose derivation device running a third pipeline to derive the third pose based on the corresponding training input data set and the image of each test object captured by the camera.

4. The non-transitory computer readable medium of claim 1, wherein when training data of a target object is input to the first and second regressors, the first and the second regressors output data representing a recommendation of one of the first and second pipelines for detecting the target object, estimating a pose of the target object and/or tracking the pose of the target object.

5. The non-transitory computer readable medium of claim 1, wherein the first regressor is obtained using a regression process.

6. The non-transitory computer readable medium of claim 5, wherein the regression process uses a Random Forest machine learning process to provide outputs based on known inputs.

7. The non-transitory computer readable medium of claim 6, wherein the Random Forest machine learning process includes:
    generating source code;
    compiling the source code; and
    storing the compiled source code in program memory of training tool software.

8. The non-transitory computer readable medium of claim 5, wherein the second regressor is obtained using a neural network to determine relative weights of input data to obtain output data.

9. A method comprising:
- storing, in a first memory area, at least two regressors, each regressor being trained to predict performances of (1) a first pipeline of an object detection (OD) and pose estimation (PE) algorithm and (2) a second pipeline of an OD and PE algorithm different from the OD and PE algorithm of the first pipeline, in response to a first feature vector corresponding to a first object as input to the regressor, the first and second pipelines being different from each other;
- storing, in a second memory area, a second feature vector corresponding to a second object;
- running the regressors with the second feature vector as input common to the regressors to predict the performances of the pipelines of the different OD and PE algorithms;
- indicating, on a display, a recommendation of at least one pipeline of the OD and PE algorithms comprising the corresponding first pipeline and the corresponding second pipeline based on the predicted performances; and
- deriving a pose of the second object by using the recommended pipeline.

10. The method of claim 9, wherein each regressor is configured to use a Random Forest machine learning process to provide outputs based on known inputs.

11. The method of claim 9, wherein each regressor is obtained using a regression process.

12. The method of claim 11, wherein the regression process predicts a performance of the OD/PE/tracking algorithms.

13. The method of claim 9, wherein a calibration marker obtains 6 degree of freedom poses of the first and second objects with respect to a camera.

14. The method of claim 9, wherein a CAD model is used to determine dimensions of the first and second objects without calibration.

15. A non-transitory computer readable medium storing instructions, when executed by one or more processors, to perform a method comprising:
- storing, in a first memory area, training data corresponding to an object and predetermined flag data indicating a pipeline of an object detection (OD) and pose estimation (PE) algorithm for use with the training data;
- receiving image frames including the object in a real scene captured by a camera;
- selecting one pipeline from among a plurality of pipelines of different OD and PE algorithms stored in a second memory area based on the flag data without using the image frames including the object; and
- deriving, with the selected pipeline, a pose of the object with respect to the camera, using the image frames and the training data.

* * * * *